United States Patent [19]
Yokomori et al.

[11] Patent Number: 5,119,452
[45] Date of Patent: Jun. 2, 1992

[54] HIGH EFFICIENCY PRISM COUPLING DEVICE AND METHOD FOR PRODUCING THE SAME

[75] Inventors: Kiyoshi Yokomori, Yokohama; Yoshinobu Nakayama, Kawasaki; Shigeyoshi Misawa, Tokyo; Tami Isobe, Yokohama; Syunsuke Fujita, Kawasaki; Hiroyoshi Funato, Chigasaki; Magane Aoki, Yokohama, all of Japan

[73] Assignee: Ricoh Company, Ltd., Tokyo, Japan

[21] Appl. No.: 534,718

[22] Filed: Jun. 7, 1990

[30] Foreign Application Priority Data

Jun. 13, 1989 [JP] Japan .................................. 1-149969
Feb. 22, 1990 [JP] Japan .................................. 2-42099

[51] Int. Cl.⁵ .............................................. G02B 6/34
[52] U.S. Cl. .......................................... 385/36; 385/37; 385/129
[58] Field of Search ............. 350/96.11, 96.12, 96.15, 350/96.19; 385/36, 37, 129, 130, 131

[56] References Cited

U.S. PATENT DOCUMENTS

| | | | |
|---|---|---|---|
| 4,545,642 | 10/1985 | Auracher et al. | 350/96.19 |
| 4,565,422 | 1/1986 | Seymour et al. | 350/96.19 |
| 4,637,684 | 1/1987 | Tomita et al. | 350/96.19 |
| 4,653,844 | 3/1987 | Ward | 350/96.15 |
| 4,877,301 | 10/1989 | Yokomori et al. | 350/96.19 |
| 4,932,743 | 6/1990 | Isobe et al. | 350/96.19 |

*Primary Examiner*—Frank Gonzalez
*Assistant Examiner*—Phan T. Heartney
*Attorney, Agent, or Firm*—Cooper & Dunham

[57] ABSTRACT

A high efficiency prism coupling device that comprises a substrate, an optical waveguide layer disposed on the substrate, a gap adjuster layer disposed on the waveguide layer and a prism secured to the gap adjuster layer through a dielectric adhesive agent. The gap adjuster layer has a refractive index which is lower than that of the waveguide layer. The gap adjuster layer has a recess formed therein for guiding an incident beam to the waveguide layer through a bottom portion thereof. The adhesive agent is disposed in and around the recess and has a refractive index which is higher than that of the waveguide layer. The prism is made from a dielectric material and disposed above the recess of the gap adjuster layer through the adhesive agent. The prism has a refractive index which is higher than that of the waveguide layer. The incident beam is introduced from outside through the prism, the adhesive agent and the bottom portion of the recess to the waveguide layer.

7 Claims, 5 Drawing Sheets

HIGH EFFICIENCY PRISM COUPLING DEVICE AND METHOD FOR PRODUCING THE SAME

BACKGROUND OF THE INVENTION

1. Field of the Invention

The present invention relates to a high efficiency prism coupling device used for optical integrated circuits, optical sensors, and other optical devices. The present invention also relates to a method for producing the prism coupling device.

2. Description of the Related Art

A prism coupling device comprises a prism and a light guide layer to which an optical beam is guided through the prism so that the prism is optically coupled with the light guide layer. The prism is directly press bonded to the surface of the light guide layer to easily obtain a high coupling efficiency between the prism and the light guide layer.

However, in accordance with the optical coupling structure in which the prism is directly press bonded to the optical waveguide layer, the device is easily affected by mechanical vibrations or impacts, which causes the instability of the coupling efficiency of the device.

To cope with the problem mentioned above, the prism is disposed apart from the optical waveguide layer surface forming a predetermined gap therebetween instead of being directly bonded to the waveguide layer surface. The structure is more precisely described below.

An example of the structure comprises a substrate on which an optical waveguide layer having a high refractive index is formed. On the surface of the high refractive index waveguide layer, a gap adjuster layer having a low refractive index is formed. Further, on the low refractive index gap adjuster layer, a prism having a high refractive index is secured through a cement layer having a high refractive index used as an adhesive agent to bond the prism to the gap adjuster layer.

Due to the arrangement of the low refractive index gap adjuster layer between the prism and the waveguide layer, the prism is not easily affected by the vibrations or impacts, which makes it possible to maintain the gap between the prism and the waveguide layer constant so that the optical coupling efficiency becomes stable.

However, the incident beam to be coupled with the waveguide layer is functioned by the optical element (the prism in this example) disposed on the waveguide layer so that the beam is converged, reflected, passed through or coupled. therefore, to heighten the coupling efficiency, it is necessary to introduce the beam to the waveguide layer from a predetermined direction at an angle $\theta$ with respect to the normal line of the waveguide layer surface. For this purpose, it is necessary to guide the incident beam to an edge of the cement layer of the structure mentioned above.

The reason why the beam is to be guided and impinged to the edge of the cement layer is as follows.

It the beam is guided to the center or around the center of the cement layer, the beam is transmitted to the waveguide layer through the cement layer first and after that the beam is recoupled with the prism and emitted out of the device, which is called decoupling phenomenon and which lowers the optical coupling efficiency. On the other hand, if the beam is guided to the edge of the cement layer, the beam is not recoupled with the prism so that it becomes possible to avoid the decoupling phenomenon.

However, the position of the edge of the cement layer which is used as an adhesive bonding means is not always constant so that it is difficult to predetermine the position of the edge. Also, it becomes necessary to change the incident point of the beam according to the position of the edge of the cement layer. However, it is very troublesome to change the position of the incident point of the beam since the optical system is constituted so that the beam is guided from a predetermined direction.

SUMMARY OF THE INVENTION

Therefore, it is an object of the present invention to provide a prism coupling device of high efficiency and the method for producing the device.

The above mentioned object of the present invention can be achieved by a prism coupling device in accordance with a first embodiment of the invention comprising: a substrate; an optical waveguide layer disposed on the substrate; a gap adjuster layer disposed on a surface of the waveguide layer and having a lower refractive index than the waveguide layer, the adjuster layer having a portion in which an opening is formed in a side adjacent to the adhesive agent, the thichness of the portion being thinner than that of the area around the opening portion so that the maximum coupling efficiency can be obtained; a dielectric adhesive agent disposed on a surface of the gap adjuster layer and having a higher refractive index than the waveguide layer; and a dielectric prism disposed on a surface of the adhesive agent and having a higher refractive index than the waveguide layer.

Also, the above mentioned object of the present invention can be achieved by a prism coupling device in accordance with a second embodiment of the invention comprising: a substrate; an optical waveguide disposed on a surface of the substrate; a first gap adjuster layer disposed on a surface of the waveguide layer and having a lower refractive index than the waveguide layer; a dielectric adhesive agent disposed on a surface of the first gap adjuster layer and having a higher refractive index than the waveguide layer; a dielectric prism disposed on a surface of the adhesive agent and having a higher refractive index than the waveguide layer; and a second gap adjuster layer disposed between the first gap adjusted layer and the adhesive agent and having a lower refractive index than the waveguide layer, the second gap adjuster layer having an opening formed in a region adjacent to the adhesive agent for guiding the incident beam.

Further, the above mentioned object of the present invention can be achieved by a method for producing a prism coupling device comprising steps of: forming an optical waveguide layer on a substrate; forming a first gap adjuster layer made from an inorganic material on the waveguide layer; coating the first gap adjuster layer with a second gap adjuster layer made from an organic material by way of spin coating; forming the second gap adjuster layer made from an organic material on said first gap adjuster layer; disposing a mask having a pattern of opening on said organic material of said second gap adjuster layer; exposing said organic material through the mask; developing the organic material to remove the organic material to form an opening therein using an developing solvent.

An advantage of the first embodiment of the present invention is that it becomes possible to prevent the beam from decoupling with the prism and emitting out of the device after being once entered into the waveguide layer of the device, since the beam incident from outside is guided to the opening of the gap adjuster layer through the prism and transmitted to the waveguide layer in a state of the maximum coupling efficiency.

Also, an advantage of the second embodiment of the present invention is that it becomes possible to prevent the beam from decoupling with the prism and emitting out of the device after being once entered into the waveguide layer of the device; by arranging the second gap adjuster layer sufficiently thick, since the beam incident from outside is guided to the opening of the second gap adjuster layer through the prism and transmitted to the waveguide layer through the first gap adjuster layer at the position of the opening in a state of the maximum coupling efficiency.

Further, an advantage of the method for producing the prism coupling device mentioned above is that it becomes possible to easily control the etching process by using the first gap adjuster layer as an etching stopper for the second gap adjuster layer, since the opening is formed in the second gap adjuster layer by etching in a state that the inorganic first gap adjuster layer is coated with the organic second gap adjusted layer.

Further objects and advantages of the present invention will be apparent from the following description of the preferred embodiments of the invention as illustrated in the accompanying drawings.

DESCRIPTION OF THE PREFERRED EMBODIMENTS

Figure 1:
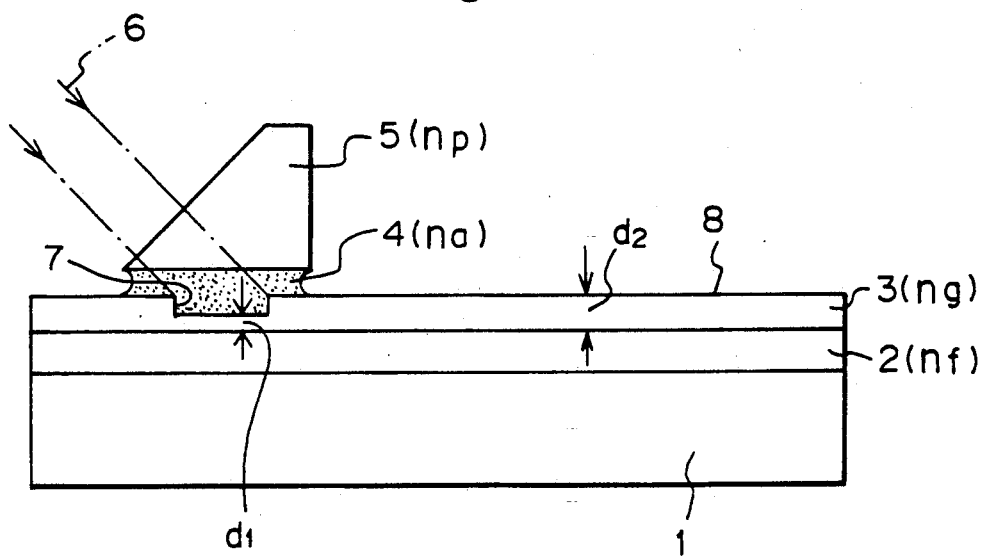
FIG. 1 is a side view of an embodiment of the prism coupling device in accordance with the present invention.

Embodiments of the present invention are described hereinafter with reference to the drawings in comparison to the related art which is also illusteated in the drawings.

Figure 9:
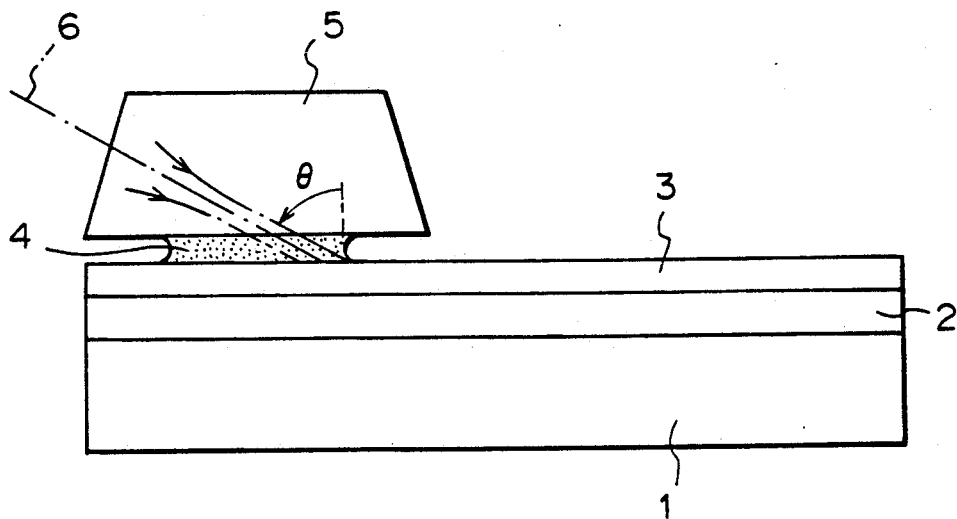
FIG. 9 is a side view of a prism coupling device in accordance with the related art.

FIG. 9 illustrates an example of the prism coupling device in accordance with the related art.

The example of the prism coupling structure comprises a substrate 1 on which an optical waveguide layer 2 having a high refractive index is formed. On the surface of the high refractive index waveguide layer 2, a gap adjuster layer 3 having a low refractive index is formed. Further, on the low refractive idex gap adjusted layer 3, a prism 5 having a high refractive index is secured through a cement layer 4 having a high refractive index used as an adhesive agent to bond the prism 5 to the gap adjuster layer 3.

Due to the arrangement of the low refractive index gap adjuster layer 3 between the prism 5 and the waveguide layer 2, the prism 5 is not easily affected by the vibrations or impacts, which makes it possible to maintain the gap between the prism 5 and the waveguide layer 2 constant so that the optical coupling efficiency becomes stable.

However, the incident beam 6 to be coupled with the waveguide layer 2 is functioned by the optical element (the prism 5 in this example) disposed on the waveguide layer 2 so that the beam 6 is converged or reflected by the element or passes through the element to be coupled with the waveguide layer. Therefore, to heighten the coupling efficiency, it is necessary to introduce the beam 6 to the waveguide layer 2 from a predetermined direction at an angle $\theta$ with respect to the normal line of the waveguide layer surface. For this purpose, it is necessary to guide the incident beam 6 to an edge of the cement layer 4 of the structure mentioned above.

Figure 10:
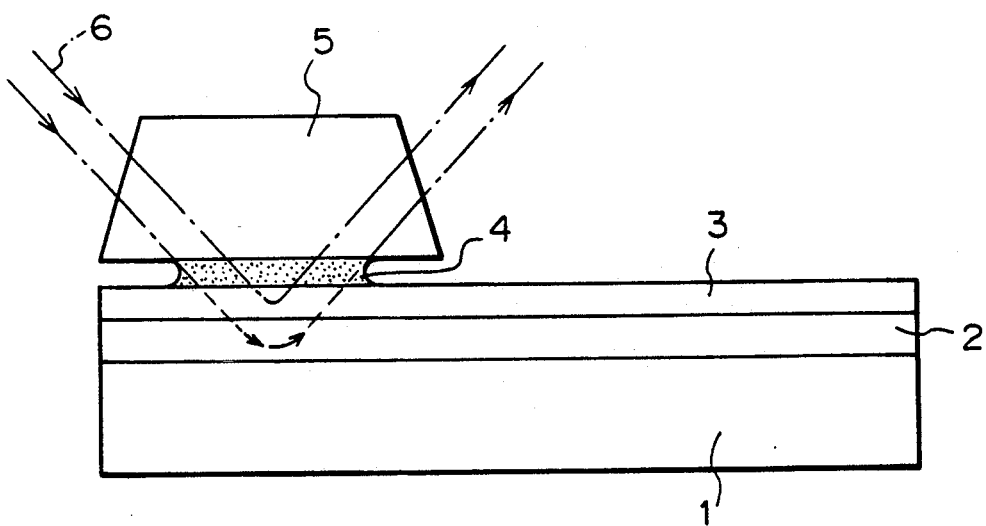
FIG. 10 is an explanatory view for explaining the decoupling phenomenon of a prism coupling device.

The reason why the beam 6 is to be guided and impinged to the edge of the cement layer 4 is explained below with reference to FIG. 10.

If the beam 6 is guided to the center or around the center of the cement layer 4, the beam 6 is transmitted to the waveguide layer 2 through the cement layer 4 first and after that the beam 6 is recoupled with the prism 5 and emitted out of the device, which is called decoupling phenomenon and which lowers the optical coupling efficiency. On the other hand, if the beam 6 is guided to the edge of the cement layer 4, the beam 6 is not recoupled with the prism 5 so that it becomes possible to avoid the decoupling phenomenon.

However, the position of the edge of the cement layer 4 which is used as an adhesive bonding means is not always constant so that it is difficult to predetermine the position of the edge. Also, it becomes necessary to change the impinging point of the beam incident to the waveguide layer 2 according to the position of the edge of the cement layer. However, it is very troublesome to change the position of the impinging point of the beam since the optical system is constituted so that the incident angle of the beam is predetermined and the beam is guided from a predetermined direction.

The above mentioned problems are attenuated by an embodiment of the present invention described below.

A first embodiment of the prism coupling device in accordance with the present invention is explained hereinafter with reference to FIGS. 1 and 2. Note that the same or corresponding parts are designated by the same reference numerals as the structure of FIG. 9, mentioned before.

On a substrate 1, an optical waveguide layer 2 is formed. The waveguide layer 2 has a refractive index nf. On a surface of the layer 2, a gap adjuster layer 3 is formed. The adjuster layer 3 has a refractive index ng which is smaller than the refractive index nf of the waveguide layer 2. A dielectric adhesive agent 4 is disposed on the adjuster layer 3. The adhesive agent 4 has a refractive index na which is larger than the refractive index nf of the waveguide layer 2. A dielectric prism 5 is disposed on the adhesive agent 4. The prism 5 has a refractive index np which is larger than the refractive index nf of the waveguide layer 2.

An opening 7 in a form of a recess is formed in the upper side surface of the layer 3 in the portion facing to the adhesive agent 4. The incident beam 6 is guided through the opening 7 into the layered structure from outside. The thickness $d_1$ of the layer 3 at the portion of the opening 7 is smaller than the thickness $d_2$ of the layer 3 at the portion 8 other than the opening 7. The thickness $d_1$ is determined so that the optical coupling efficiency becomes maximum, as represented in the graph of FIG. 2.

The relation between the refractive indices of the above mentioned components of the device are represented as follows.

$$np .na > nf > ng$$

In accordance with the structure mentioned above, the beam 6 incident to the prism 5 from outside is guided and propagates through the adhesive agent 4 into the opening 7 of the layer 3.

Figure 2:
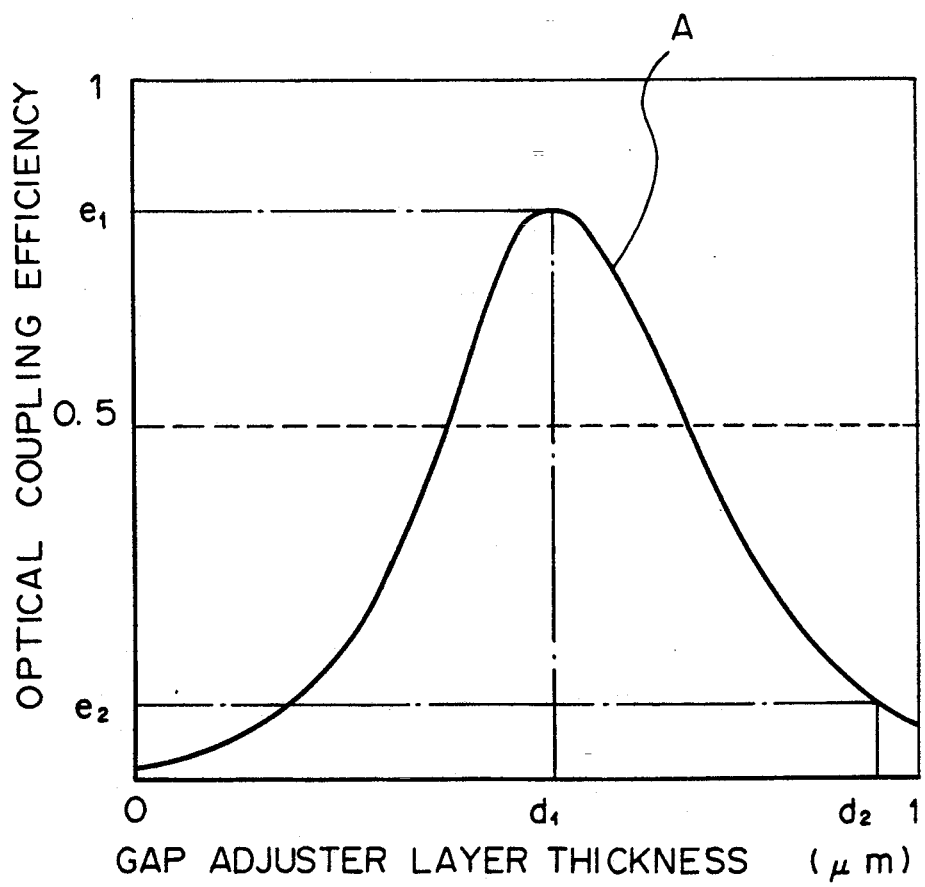
FIG. 2 is a graphical view of the optical coupling efficiency with respect to the thickness of the gap adjuster layer of the prism coupling device of FIG. 1.

The value of the optical coupling efficiency of the layer 3 at the opening 7 is represented by $e_1$ which is positioned at the peak of the graph A of FIG. 2, while the coupling efficiency of the layer 3 at the portion 8 having a thickness of $d_2$ around the opening 7 is represented by $e_2$ which is far lower than $e_1$ ($e_2 < e_1$).

Due to the low coupling efficiency $e_2$ of the layer 3 at the portion 8 around the opening 7, it becomes possible to reduce the optical amount of the beam which is transmitted back to the prism 5 and emits outward through the prism 5 by the decoupling function of the device. The beam 6 is coupled with the waveguide layer 2 in the coupling efficiency state of $e_1-e_2$. The coupling efficiency $e_2$ can be minimized by arranging the portion 8 of the layer 3 sufficiently thick so as to minimize the optical amount of the beam which emits outward by decoupling to almost zero, which makes it possible to obtain a maximum coupling efficiency of the device.

Another embodiment of the present invention is further described more precisely with reference to FIG. 3 hereinafter.

Figure 3:
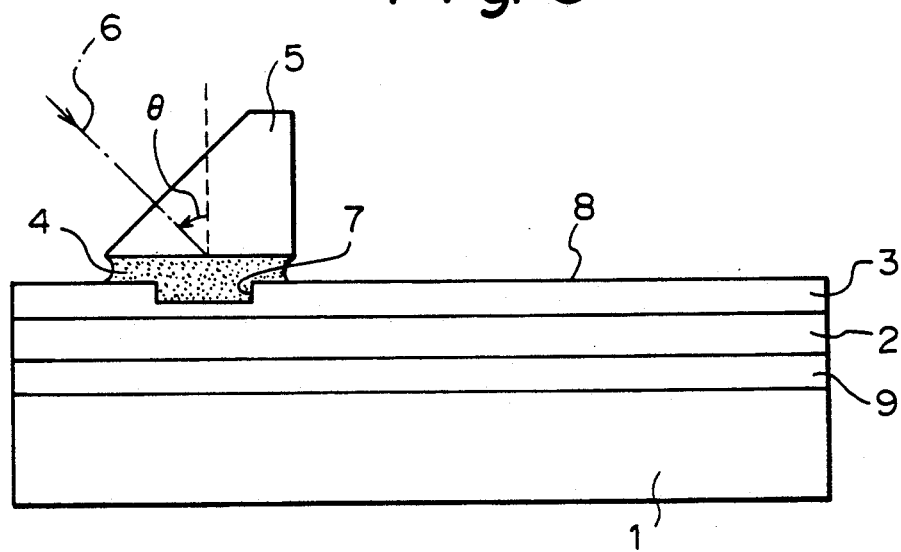
FIG. 3 is a side view of another embodiment of the prism coupling device in accordance with the present invention.

The parts of the coupling device of FIG. 3 are made from the materials specified below.

Substrate 1: Si
Buffer layer 9: $SiO_2$ (nb = 1.46, db = 2 μm) produced by heat oxidization of the $SiO_2$ substrate
Optical waveguide layer 2: SiON (nf = 1.70, df = 1 μm)
Gap adjuster layer 3: $SiO_2$ (ng = 1.46) produce by CVD or sputtering
Dielectric prism 5: optical glass having high refractive index (np = 1.80)
Dielectric adhesive agent 4: optically transparent material having high refractive index, such as polyimide resin (na = 1.72)

wherein references db and df designate the thickness of the buffer layer 9 and the waveguide layer 2, respectively. Also, the gap adjuster layer 3 has a thickness $d_1 = 0.28$ μm at the portion of opening 7 and a thickness $d_2 = 0.70$ at the portion 8 around the opening 7.

A method for forming the opening 7 which is one of featured points of the present invention is described hereinafter.

The opening 7 is formed basically by an etching process with the use of photolithography technique. That is, first, the gap adjuster layer 3 is evenly formed on the surface of the waveguide layer 2 in such a state that the thickness of the layer 3 is 0.70 μm for the entire area of the layer 3 uniformly. A photoresist agent is coated on the layer 3. On the photoresist agent is disposed a mask at the position where the opening is to be formed. The photoresist agent is exposed through the mask and developed so that the resist agent at the portion of the opening 7 is removed. After that, the layer 3 is etched by a buffering hydrofluoric acid until the layer 3 becomes 0.28 μm thick at the portion of the opening 7. After that, the resist agent is removed and the prism 5 is bonded to the layer 3 with the use of the dielectric adhesive agent 4. In this case, it is desirable that the opening 7 is completely filled with the adhesive agent 4.

In the particular embodiment mentioned above, the equivalent refractive index N for the beam of $TE_0$ is represented as N = 1.68. When the incident angle $\theta$ of the beam 6 is 67 degrees, the $TE_0$ mode beam is coupled to the waveguide layer 2. Note that the incident beam 6 is a laser beam of He-Ne having a wavelength of 0.6328 μm.

Figure 4:
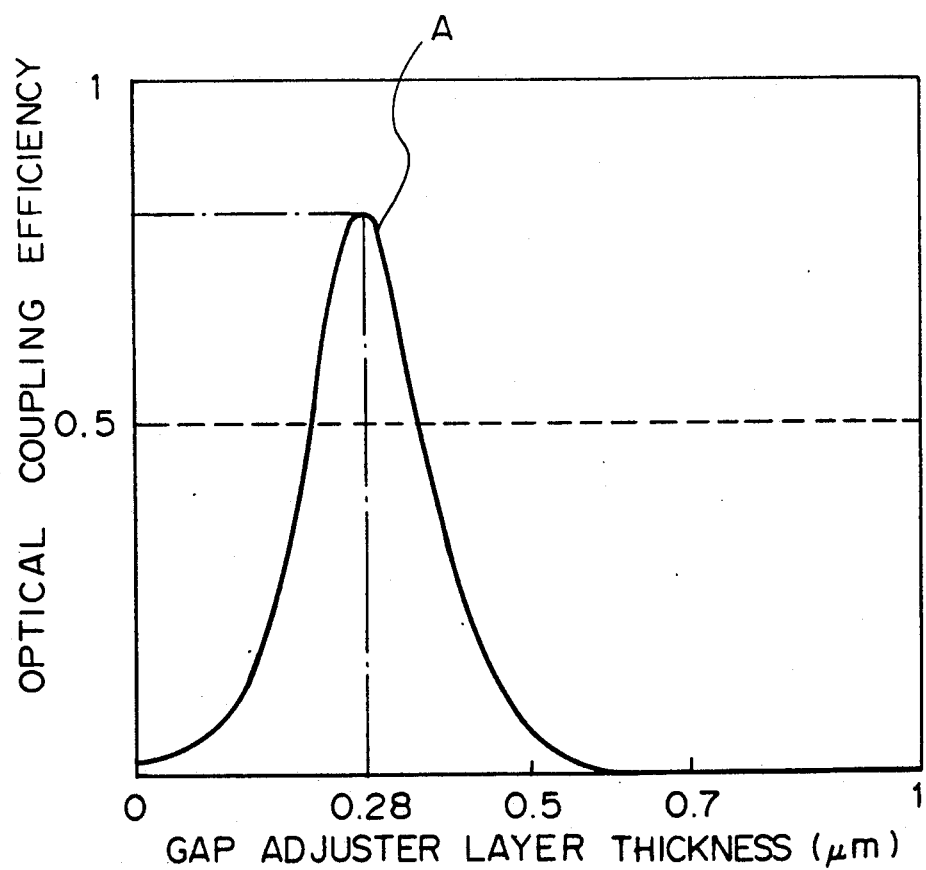
FIG. 4 is a graphical view of the optical coupling efficiency with respect to the thickness of the gap adjuster layer of the prism coupling device of FIG. 3.

FIG. 4 represents a graph A of optical coupling efficiency in relation to the thickness of the gap adjuster layer 3. The graph is made on the basis of the measurement result using the beam 6 which has a beam diameter of 2 mm which is the same as that of the width of the opening 7. As can be seen from the graph of FIG. 4, the coupling efficiency at the portion of the opening 7 is more than 80%. Also, due to the arrangement that the thickness of the layer 3 around the opening 7 is 0.70 μm, it becomes that the optical amount of the beam which emits out of the device by decoupling is zero. In accordance with the structure arranged as mentioned above, when the incident beam 6 having a wavelength of 0.6328 μm is input to the prism 5 at an incident angle of 67 degrees, it is possible to transmit the $TE_0$ mode beam to the waveguide layer 2 at an efficiency of 80% or more.

As mentioned above, the opening 7 can be accurately formed at a desired position by photolithography technique, which makes it possible to guide the optical beam to a desired position so that the beam is reliably guided to a desired waveguide.

It is to be noted that the optimal thickness of the layer 3 depends on the waveguide mode of the beam so that it is necessary to change and adjust the thickness of the layer 3 according to the waveguide mode.

Another embodiment of the present invention is described hereinafter with reference to FIGS. 5 and 6. This embodiment is featured in the shape of the opening 7 formed in the gap adjuster layer 3.

Figure 5:
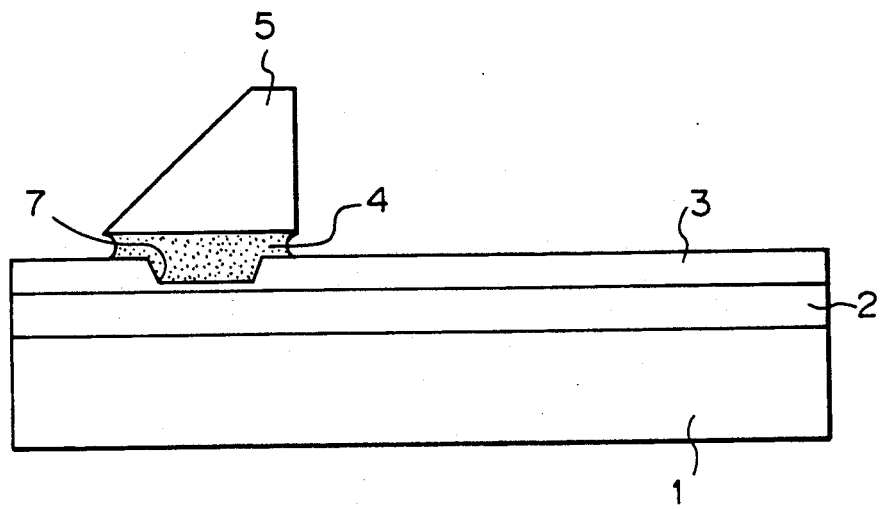
FIG. 5 is a side view of a still another embodiment of the prism coupling device in accordance with the present invention in which the side wall of the gap adjuster layer is inclined.

As illustrated in FIG. 5, the vertical side walls of the opening 7 are inclined instead of being perpendicular to the layer surface as is the case of FIG. 1 or 3. By arranging the side walls of the opening 7 inclined, it becomes possible to minimize the loss of light due to the reflection or scattering of the light at the vertical side wall, which avoids reduction of the optical amount of light to be transmitted to the waveguide layer 2.

Figure 6:
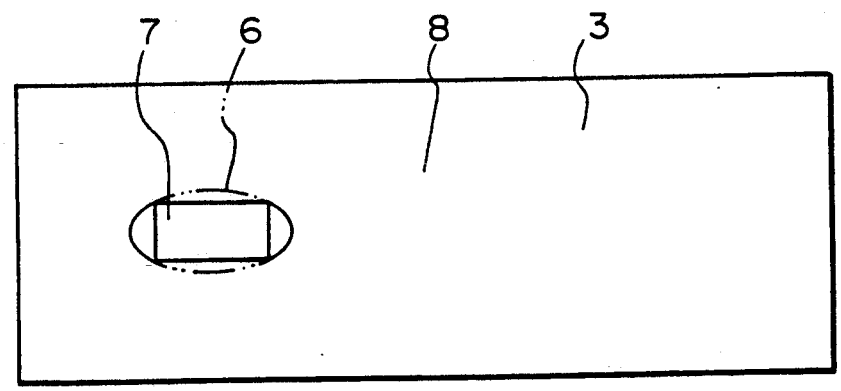
FIG. 6 is a plan view of a gap adjuster layer of the present invention in which an opening is formed in the layer.

FIG. 6 represents a plan view of the opening 7 formed in the layer 3. As can be seen from the drawing, the opening 7 has a rectangular shape which is smaller than the spot of the beam 6.

The shape of the opening 7 may be circular or oval corresponding to the shape of the beam spot, instead of being rectangular. It is to be noted that in any case, the layer thickness in the bottom of the opening 7 has to be arranged so that the maximum coupling efficiency is obtained corresponding to the beam diameter.

Figure 7:
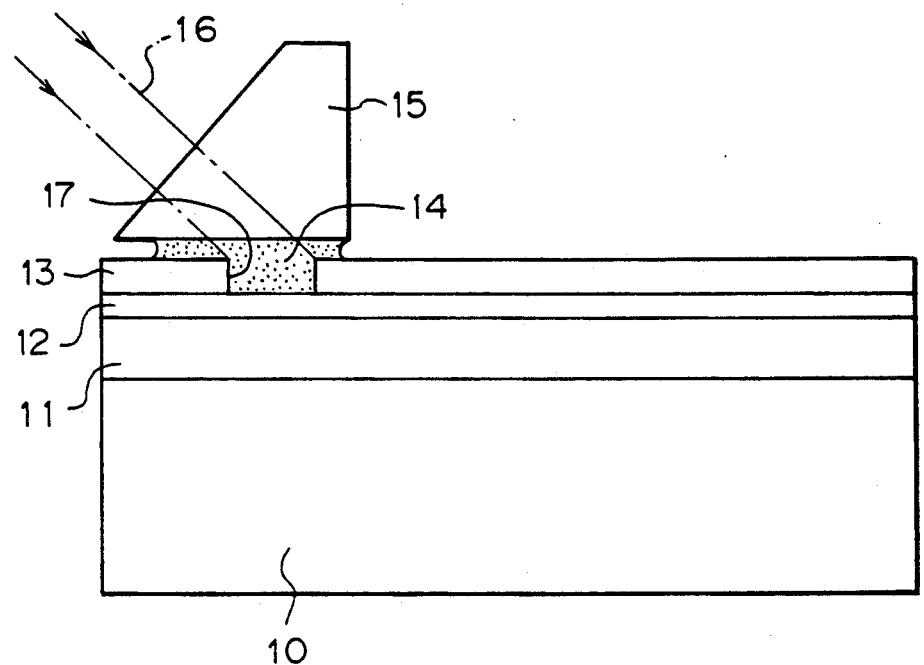
FIG. 7 is a side view of a still another embodiment of the prism coupling device in accordance with the present invention.

FIG. 7 illustrates a still further embodiment of the present invention.

On the substrate 10, an optical waveguide layer 11 having a refractive index nf is formed. On the surface of the layer 11, a first gap adjuster layer 12 is formed. The refractive index $ng_1$ of the layer 12 is smaller than the refractive index nf of the layer 11. Also, on the surface of the layer 12, a second gap adjuster layer 13 is formed. The refractive index $ng_2$ of the layer 13 is smaller than the refractive index nf of the layer 11. Further, on the layer 13 is disposed a dielectric adhesive agent 14 having a refractive index na which is higher than the refractive index nf of the layer 11. A dielectric prism 15 is disposed on the adhesive agent 14. The refractive index np of the prism 15 is higher than the refractive index nf of the layer 11.

The embodiment of FIG. 7 is featured in that the layer 13 has an opening 17 in the form of a through hole at the portion of the adhesive agent 14. The incident beam 16 is guided through the through hole opening 17 into the layered structure. The first gap adjuster layer 12 is so arranged that the layer 12 has an optimal refractive index and thickness in response to the size of the beam 16 at the bottom surface of the prism 15 and the length of the opening 17 of the layer 13.

The relation between the refractive indices of the layers 11, 12, 13, the agent 14 and the prism 15 is represented as follows.

$$np \simeq na > nf > ng_1 \simeq ng_2$$

In accordance with the structure mentioned above, there is an optimal thickness $d_1$ of the layer 12 with respect to the length l of the through hole opening 17 of the layer 13 for coupling the beam 16 with the layer 11 at a maximum coupling efficiency. Also, the optical amount of the light once guided into the layer 11 and transmitted back to the prism 15 due to the decoupling phenomenon is increased according as the thickness $d_2$ of the layer 13 is reduced, which decreases the optimal amount of the light coupled with the layer 11. Therefore, when the optimal thickness $d_1$ of the layer 12 is determined, it becomes possible to minimize the decoupling light to almost zero to obtain a maximum coupling efficiency by sufficiently thickening the layer 13 with respect to the layer 12. Therefore, it is desirable to arrange the layers 12 and 13 in such a way that the thickness $d_1$ of the layer 12 is determined as an optimal thickness and the thickness $d_2$ of the layer 13 is as large as possible.

The structure of FIG. 7 is further described concretely as follows. Note that the wavelength of the incident beam 16 is 0.6328 μm.

Substrate: glass(quartz n=1.46)
Optical waveguide layer: SiON (nf=1.70, df=1.0 μm) formed by CVD
First gap adjuster layer: SiO$_2$ ($ng_1$=1.46, $dg_1$=0.28 μm)
Second gap adjuster layer: OCD (coating film agent of SiO$_2$ group) ($dg_2$=0.5 μm)
Dielectric prism: high refractive index optical glass (np=1.80)
Dielectric adhesive agent: optically transparent high refractive index material such as polyimide resin (na=1.72)

The length of the through hole opening 17 of the layer 13 is 2 mm. The opening 17 is formed in accordance with the process as follows.

First, the first gap adjuster layer 12 is formed on the layer 11. The layer 12 is coated with OCD by spin coating. After that, the OCD film is coated with a photoresist agent. On the photoresist is disposed a mask having a pattern corresponding to the opening 17. The photoresist is exposed through the mask and developed to remove the photoresist in the portion corresponding to the opening 17. After that, the layer 13 (OCD) is etched by a buffering hydrofluoric acid used as an etching solution. The etch rate of the OCD layer 13 is 600 Å/sec. Also, the etch rate of the SiO$_2$ layer is 100 Å/sec. The SiO$_2$ layer 12 functions substantially as an etch stop due to the sufficiently large ratio 6:1 between the etch rates of the layers 13 and 12. The larger the ratio between the etch rates is, the more easily the etching process can be controlled.

In accordance with the above mentioned structure of the optical coupling device, the refractive index N for a propagating TE$_o$ mode beam becomes as N=1.68. When the incident angle of the beam is 67 degrees, the Te$_o$ mode beam is coupled to the waveguide layer 11 at a coupling efficiency of about 80%. Also, the optical amount of the decoupling light becomes almost zero due to the arrangement of the layer 13 having a sufficiently large thickness of 0.5 μm.

Figure 8:
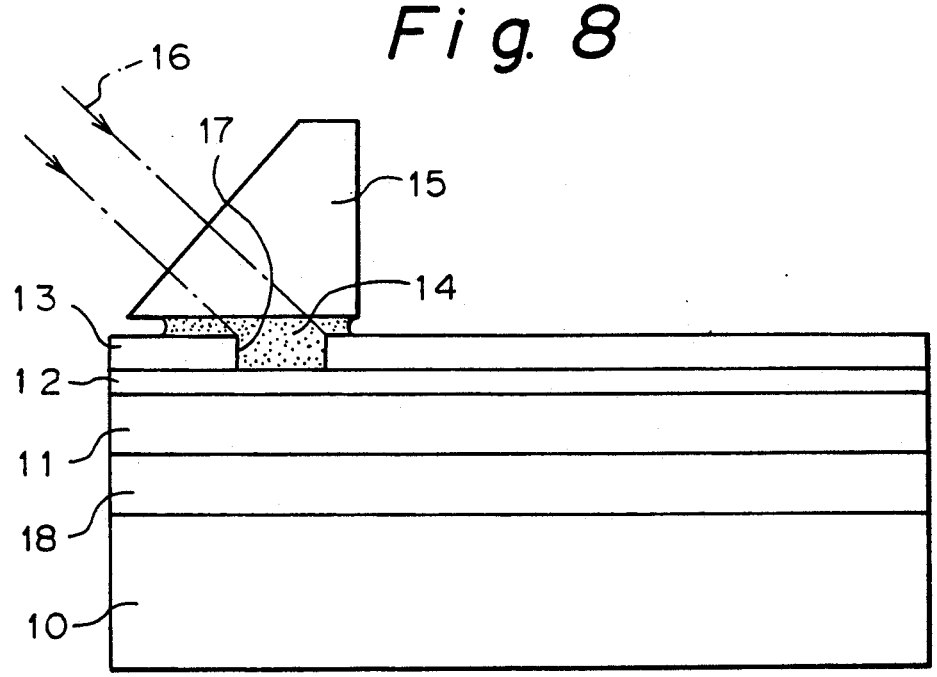
FIG. 8 is a side view of a still another embodiment of the prism coupling device in accordance with the present invention.

FIG. 8 illustrates a still further embodiment of the present invention.

The structure of FIG. 8 is specified as follows.
Substrate 10: Si (quartz, n=1.46)
Buffer layer 18: SiO$_2$(nf=1.46, db=2 μm)
Optical waveguide layer 11: SiON (nf=1.46, df=1.0 μm) formed by CVD
First gap adjuster layer 12: SiO$_2$ ($ng_1$=1.46, $dg_1$=0.28 μm)
Second gap adjuster layer 13: PMMA ($ng_2$=1.48, $dg_2$=0.5 μm)
Dielectric prism 15: high refractive index optical glass (np=1.80)
Dielectric adhesive agent 14: optically transparent high refractive index material such as polyimide resin (na=1.72)

The length of the through hole opening 17 of the layer 13 is 2 mm. The opening 17 is formed in accordance with the process described as follows.

The layer 12 is formed on the layer 11. The PMMA layer 13 is formed on the layer 12 by spin coating to a predetermined thickness (0.5 μm). After that, a part of the PMMA layer 13 corresponding to the portion where the opening 17 is to be formed is exposed by an electron beam. The PMMA layer is then developed so that the portion thereof corresponding to the opening 17 is removed. It is to be noted that in this developing process, the layer 12 does not physically change at all since the layer 12 is made from SiO$_2$, which makes it possible to effectively produce the structure having a high coupling efficiency as the embodiment of FIG. 7, mentioned before.

It is also to be noted that only the layer 12 has to be controlled to have a predetermined optimal thickness due to the arrangement wherein the layer 12 is made from an inorganic material and the layer 13 is made from an organic material. Also, the buffer layer 18 is disposed between the substrate 10 and the waveguide layer 11.

As mentioned above, in accordance with the embodiment of the present invention, a recess shaped opening is formed in the gap adjuster layer at a portion where the dielectric adhesive agent is disposed for guiding the incident beam into the layered structure from outside through the prism. Also, the thickness of the gap adjuster layer in the portion where the opening is formed (that is, the thickness of the bottom part of the recess) is determined to be smaller than the thickness of the portion around the opening so that a maximum optical coupling efficiency can be obtained at the determined thickness of the layer in the portion of the opening. Due to the arrangement mentioned above, the incident beam from outside is guided through the prism to the opening of the gap adjuster layer and transmitted to the waveguide layer in a state of maximum coupling efficiency. This makes it possible to avoid the decoupling phenomenon in which the light once introduced into the waveguide layer is transmitted back to the prism and emitted outward. Therefore, it becomes unnecessary to irradiate the incident beam to the edge of the adhesive agent to avoid the decoupling phenomenon as in the case of the related art. Accordingly, the optical beam can be effectively used at a high coupling efficiency without being involved in a troublesome manipulation of the device.

In accordance with the other embodiment of the present invention, a second gap adjuster layer is disposed between a first gap adjuster layer and a dielectric adhesive agent layer. The second gap adjuster layer has a refractive index which is smaller than that of the waveguide layer. Also, the second gap adjuster layer has a through hole opening formed therein at the portion adjacent to the adhesive agent for guiding the incident beam to the waveguide layer. The beam incident to the prism penetrates through the prism and guided to the through hole opening of the second gap adjuster layer. The beam further transmits through the opening to the first gap adjuster layer disposed beneath the opening and penetrates therethrough so that the beam is introduced to the waveguide layer at a maximum optical coupling efficiency. In accordance with the arrangement mentioned above, by sufficiently thickening the second gap adjuster layer, it becomes possible to avoid the decoupling phenomenon in which the beam once transmitted to the waveguide layer is guided back to the prism and emitted outward therefrom. Therefore, the optical beam can be effectively used at a high coupling efficiency in comparison to the related art.

Also, in accordance with the method for producing the coupling device of the present invention, a first gap adjuster layer made from an inorganic material is coated with a second gap adjuster layer made from an other material which is etched or developed to form an opening through the second gap adjuster layer with the use of an etching solution or a developer, wherein the first gap adjuster layer functions as an etch stop or developing stop layer for the second gap adjuster layer, which makes it possible to easily control the etching process or developing process.

Many widely different embodiments of the present invention may be constructed without departing from the spirit and scope of the present invention. It should be understood that the present invention is not limited to the specific embodiments described in the specification, except as defined in the appended claims.

What is claimed is:

1. A high efficiency prism coupling device comprising:
   a substrate;
   an optical waveguide layer disposed on said substrate;
   a dielectric gap adjuster layer disposed on said waveguide layer and having a refractive index which is lower than that of said waveguide layer, said gap adjuster layer having a recess formed therein for guiding an incident beam to said waveguide layer through a bottom portion thereof;
   a dielectric adhesive agent disposed in and around said recess of said gap adjuster layer, said adhesive agent having a refractive index which is higher than that of said waveguide layer; and
   a dielectric prism disposed above said recess of said gap adjuster layer and coupled therewith through said adhesive agent, said prism having a refractive index which is higher than that of said waveguide layer, said incident beam being introduced from outside through said prism, said adhesive agent and said bottom portion of said recess to said waveguide layer.

2. A high efficiency prism coupling device according to claim 1, wherein said bottom portion of said recess has a thickness arranged so that a maximum optical coupling efficiency is obtained at said thickness with respect to a beam passing through said recess.

3. A high efficiency prism coupling device comprising:
   a substrate;
   an optical waveguide layer disposed on said substrate;
   a first gap adjuster layer disposed on said waveguide layer and having a refractive index which is lower than that of said waveguide layer;
   a dielectric second gap adjuster layer disposed on said first gap adjuster layer and having a refractive index which is lower than that of said waveguide layer, said second gap adjuster layer having a through hole formed therein for guiding an incident beam therethrough to said waveguide layer through said first gap adjuster layer;
   a dielectric adhesive agent disposed in and around said through hole of said second gap adjuster layer, said adhesive agent having a refractive index which is higher than that of said waveguide layer; and
   a dielectric prism disposed above said through hole of said second gap adjuster layer and coupled therewith through said adhesive agent, said prism having a refractive index which is higher than that of said waveguide layer, said incident beam being introduced from outside through said prism, said adhesive agent, said through hole and said first gap adjuster layer to said waveguide layer.

4. A high efficiency prism coupling device according to claim 3, wherein the etch rate of said second gap adjuster layer is higher than that of said first gap adjuster layer with respect to the same etching agent.

5. A method for producing a high efficiency prism coupling device comprising steps of:
   (a) forming an optical waveguide layer on a substrate;
   (b) forming a first gap adjuster layer made from an inorganic material on said waveguide layer;

(c) forming a second gap adjuster layer made from an organic material on said first gap adjuster layer;

(d) disposing a mask having an opening pattern on said organic material of said second gap adjuster layer;

(e) exposing said organic material through said mask;

(f) developing said organic material to remove said organic material to form an opening therein using a developing solvent.

6. A method for producing a prism coupling device according to claim 5, wherein the resolving rate of said second gap adjuster layer is higher than that of said first gap adjuster layer with respect to said developing solvent.

7. A method for producing a prism coupling device according to claim 5, wherein said opening is filled with an adhesive agent and a prism is secured to said second gap adjuster layer through said adhesive agent.

* * * * *